June 11, 1968   F. D. BOND, JR., ET AL   3,387,449
METHOD OF MAKING HOSE FOR LOW-TEMPERATURE LIQUIDS
Original Filed Feb. 24, 1960   2 Sheets-Sheet 1
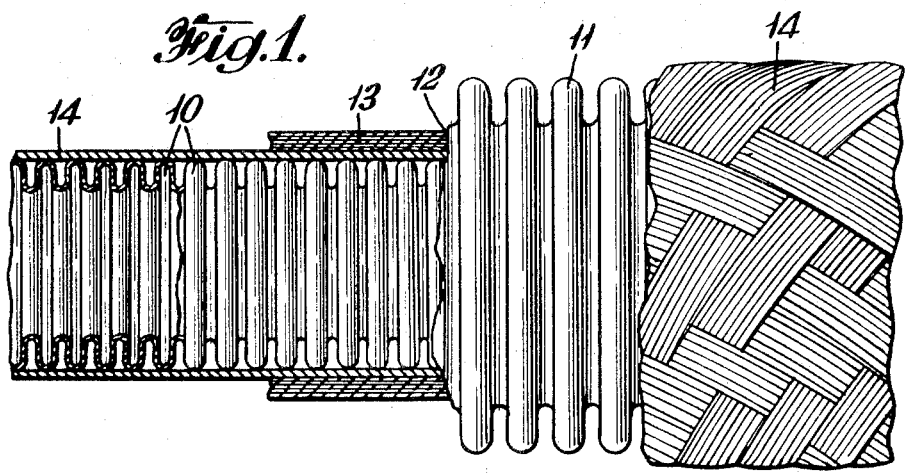
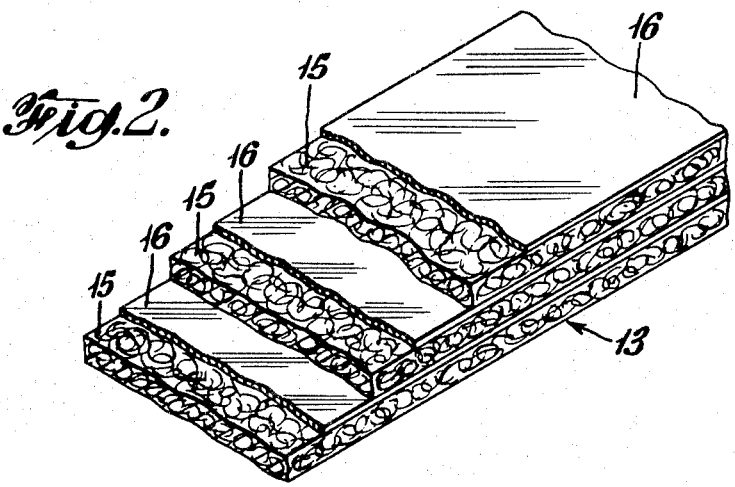
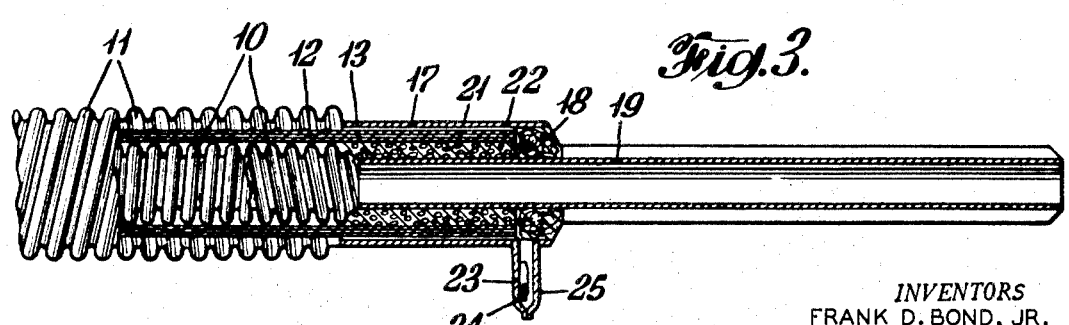
INVENTORS
FRANK D. BOND, JR.
LADISLAS C. MATSCH
JAMES A. PROCTOR
BY *John C. Ledner*
ATTORNEY June 11, 1968 F. D. BOND, JR., ET AL 3,387,449
METHOD OF MAKING HOSE FOR LOW-TEMPERATURE LIQUIDS
Original Filed Feb. 24, 1960 2 Sheets-Sheet 2
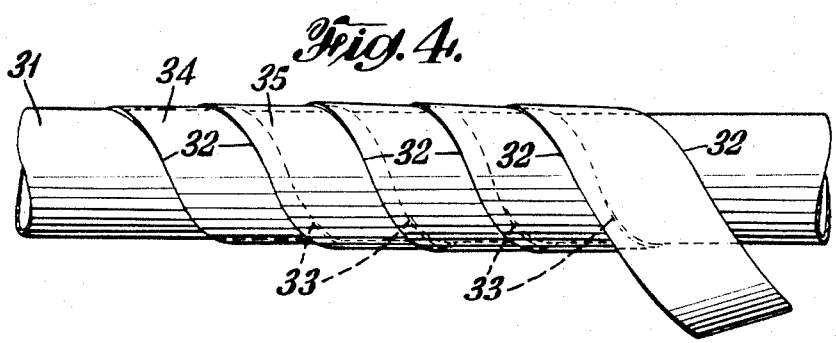
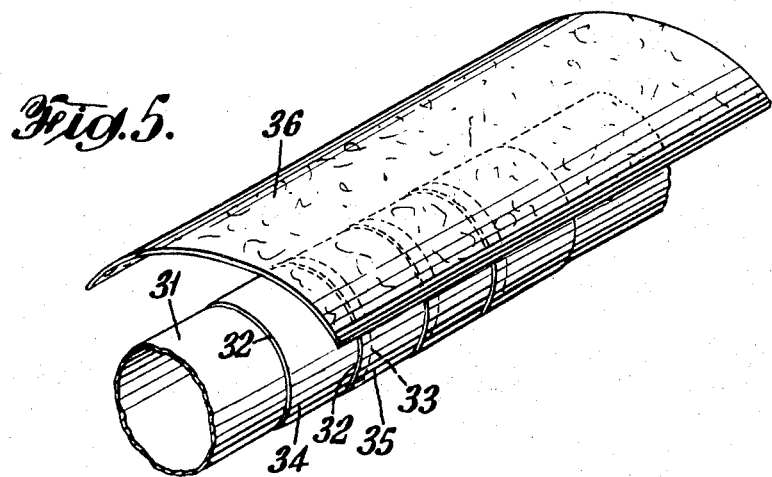
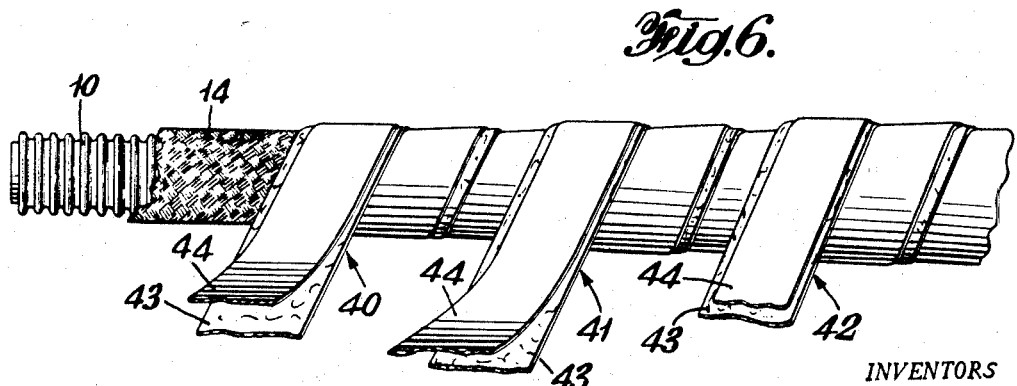
INVENTORS
FRANK D. BOND, JR.
LADISLAS C. MATSCH
JAMES A. PROCTOR
BY *John C. Le Fever*
ATTORNEY United States Patent Office 3,387,449
Patented June 11, 1968

3,387,449
METHOD OF MAKING HOSE FOR
LOW-TEMPERATURE LIQUIDS
Frank D. Bond, Jr., Buffalo, Ladislas C. Matsch, Kenmore, and James A. Proctor, Tonawanda, N.Y., assignors to Union Carbide Corporation, a corporation of New York
Application May 20, 1963, Ser. No. 282,834, now Patent No. 3,240,234, dated Mar. 15, 1966, which is a division of application Ser. No. 10,598, Feb. 24, 1960. Divided and this application Aug. 30, 1965, Ser. No. 498,175
6 Claims. (Cl. 57—160)

This is a divisional application of Ser. No. 282,834 filed May 20, 1963, now Patent No. 3,240,234 by F. D. Bond, Jr., et al., which in turn is a divisional application of Ser. No. 10,598, filed Feb. 24, 1960 by F. D. Bond, Jr., et al., now abandoned.

This invention relates to a method of making flexible hose for transferring low-boiling liquids at temperatures below about −120° C., and more particularly to a method of making flexible, insulated hose for transporting liquid hydrogen, liquid helium and the like.

When low-boiling or cryogenic liquid transfers are conducted between vessels, either or both of which are mobile (or portable), the connection of rigid transfer piping requires accurate orientation of equipment in three dimensions. Where such equipment is difficult to move, it would be advantageous to make the connection by a flexible hose.

Heretofore, liquid oxygen and nitrogen have been transferred from transport vessels to stationary storage tanks in flexible uninsulated hoses of large diameter. Such hoses were adequate for this service because the liquids were relatively inexpensive and because the volumetric flow rates were high, thus resulting in small percentage evaporation of the total liquid due to heat inleak. However, the expanding usage of such liquids often far remote from the point of production may greatly increase their value at the point of consumption and require extreme conservation measures. Furthermore the increased utilization of more expensive cryogenic fluids boiling below about −196° C., as for example liquid hydrogen and liquid helium, has created a need for flexible transfer hoses which are smaller in size and more effectively insulated against heat leak.

A satisfactory flexible hose for such service should possess at least the following characteristics:

(1) Structurally safe for processing all atmospheric gases and hydrogen.

(2) Capable of restricting heat leakage to a rate compatible with the cost of the refrigerated liquid handled.

(3) Free from cold spots on the jacket which could present a combustion hazard due to air condensation, a handling hazard, or develop frost sufficient to impede manipulation.

(4) Adequate flexibility and durability at the lowest anticipated temperature which is about 4° K., the boiling point of helium at atmospheric pressure.

(5) Minimum cooldown flash-off.

A principal object of the present invention is to provide a method of assembling a flexible, thermally insulated hose for transporting low boiling liquids.

Additional objects and advantages of this invention will be apparent from the ensuing disclosure and the appended claims.

In the drawings:

FIG. 1 is an elevational view, partly in section, of a flexible hose embodying the principles of the invention;

FIG. 2 is an isometric view of a composite insulating material employed in the invention and shown in a flattened position with parts broken away to expose underlying layers;

FIG. 3 is an elevational view, partly in section, of a flexible hose embodying the present invention and including an adsorbent-getter space;

FIG. 4 is an isometric view of a cylinder illustrating the first step of the present method for applying flexible, composite heat insulating material to a curved surface;

FIG. 5 is an isometric view of a cylinder illustrating the final step of the present method for applying flexible, composite heat insulating material to a curved surface; and FIG. 6 is an isometric view of a cylinder illustrating the steps of an alternative novel method for applying flexible composite heat insulating material to a curved surface, according to the present invention.

Briefly, one aspect of the invention comprises a hose for transporting low-boiling liquids including a flexible corrugated metallic inner conduit, a larger flexible corrugated metallic jacket being concentrically spaced around the inner conduit so as to form an evacuable annular insulation space therebetween, the minimum diameter of the flexible corrugated jacket being greater than the maximum diameter of the flexible corrugated inner conduit. The annular insulation space is substantially filled with a composite insulating material comprising alternate layers of radiation impervious barriers and low heat conductive fibrous sheets. In a preferred form, the radiation impervious barriers are aluminum foil and the low heat conductive layers are permanently precompacted sheets of unbounded glass fiber paper.

This invention also includes a method for applying alternate layer insulation in which at least one component of the insulation is provided in strip form and helically wound around a curved surface, the edges of the spirals being overlapped to provide a continuous discrete layer of the first component between two continuous discrete layers of a second component.

A corrugated tube is essentially a bellows, and it is well-known that when such tubes are exposed to a substantial pressure differential, they will expand or contract as a spring. Furthermore, the forces exerted by such corrugated tubes are considerable even at such low pressure differentials as 15 p.s.i. This force can be calculated by multiplying the pressure differential times the average cross-sectional area exposed to the P. Thus, a 3-inch corrugated tube when evacuated can exert a contracting force of almost 150 lbs. Imposing internal pressure on a corrugated tube will cause elongation with a force of similar magnitude.

Based on the foregoing considerations it would logically appear to one skilled in the art that assembling two such tubes together in concentric fashion and evacuating the space therebetween would cause the outer corrugated jacket to contract and the inner corrugated conduit to buckle severely. If a substantial positive pressure considerably above atmospheric is now improved by fluid inside the inner corrugated conduit, it will tend to elongate but being restrained by the outer corrugated jacket, the forces tending to cause buckling will be even further increased. Thus, the entire assembly would appear to be highly unstable and not at all suitable for a vacuum-insulated structure in which the inner and outer walls must not be permitted to touch each other.

Another critical factor to be considered is the extreme compression sensitivity of the alternate layer type of insulation. That is, as the layers are compressed closer and closer together, the solid conductance in the direction perpendicular to layers, increases appreciably. The above-mentioned buckling tendency of the inner conduit would appear to impose severe localized compression on the alternate layer type insulation if the latter is to be employed as a separator and support for the concentric corrugated members. Logically, this would cause areas of high heat conductance at the localized points of compression.

In spite of these enumerated problems, it has been unexpectedly found that the particular combination of elements constituting the present invention provides an improved flexible hose for transporting low-boiling liquids which restricts heat inleak to a very small value, and which retains adequate flexibility and durability at the lowest ansicipated temperature of 4° K.

Referring now more specifically to the drawings and particularly to FIGS. 1 and 2, the present flexible hose includes corrugated inner conduit 10 for transporting the low temperature liquid, and corrugated outer jacket 11 arranged concentrically with an annular space 12 therebetween. The annular space between the two tubes is filled with composite insulation 13, and maintained under a vacuum pressure of below about 30 microns of mercury.

The corrugated inner conduit 10 and outer jacket 11 may if desired, be externally covered with wire braid 14. Where the low temperature liquid supply pressure is low, the inner conduit braid may be eliminated, thus reducing liquid flash-off during cool-down of the hose. The advantage in using wire braid on the inner conduit 10 is that the allowable working pressure of the hose may be increased. The elimination of such wire braid is particularly feasible in small diameter hoses. This was demonstrated by tests in which a 1-inch diameter flexible tube without braid was hydraulically pressurized to 250 p.s.i.g. Deformation of the hose was found to be linear up to 200 p.s.i.g.; i.e. the elastic limit of the hose was not exceeded below this pressure. At 250 p.s.i.g., a permanent elongation of 1.6% resulted. Larger diameter corrugated tubes of commercially available thicknesses benefit more by external wire braid because they cannot withstand as much pressure without exceeding the elastic limit.

Stainless steel is the preferred material for the flexible, corrugated metal tubes because of its higher strength and welding convenience. Higher strength results in less mass of metal in contact with the liquid and requires less refrigeration to cool the hose to operating temperature. As to welding, the end connections on flexible hoses for cryogenic service are preferably constructed of low-conductive stainless steel, and the use of other metals such as bronze for the corrugated hose would require a dissimilar metal joint between the tube and the end connection. Dissimilar metal joints are less dependable in high-vacuum service than homogeneous welds between similiar metals.

The corrugated tubing is preferably the seamless type to minimize the possibility of vacuum leaks which in turn would decrease the insulation efficiency. However, welded corrugated tubing has been found satisfactory for use in the present invention, but a mass spectrometric (helium) leak test should be conducted on the tubes before assembly of the hose.

Corrugated flexible tubing is normally available in two forms: In the annular type illustrated in FIG. 1, the corrugations are separate and are formed normal to the tube axis, while in the helical type of FIG. 3 the corrugations are pitched and continue in helical form along the length of the tube. Hoses formed with helical convolutions appear to offer 75% as much flow resistance as those formed with annular convolutions. For this reason, the former are preferred in the practice of this invention.

Highly efficient insulation is important in flexible cryogenic hoses because it avoids unnecessary loss of valuable low-temperature liquids. Uniformity of insulation is also important in order to avoid localized cold spots on the hose. Cold spots not only result in increased heat inleak, but may also cause severe burns to operators handling or coming in contact with the hose. Furthermore, air may condense on a cold spot, thus producing a liquid enriched in oxygen which may be hazardous in contact with inflammable materials. High insulating efficiency coupled with low density and low heat capacitance are also important in cryogenic hoses in order to minimize the loss of expensive refrigeration needed to cool the hose repetitively to operating temperature. These insulating requirements must be met while preserving flexibility and thinness of the insulating layer.

The present alternate layer insulation provides unexpected advantages in vacuum-insulated flexible hoses. As more fully described and claimed in copending U.S. Ser. Nos. 597,947, 824,690 and 4,298, filed respectively on July 16, 1956, July 2, 1959 and Jan. 25, 1960, in the name of L. C. Matsch, now U.S. Patents 3,007,596, 3,009,600 and 3,009,601, respectively, the low conductive component is a fibrous insulation 15 which can be produced in sheet form. Examples of the latter include a filamentary glass material such as glass wool and fiber glass, preferably having fiber diameters of less than about 50 microns. Also such fibrous materials preferably have a fiber orientation substantially perpendicular to the direction of heat flow across the insulation. A satisfactory material consists of an elastic fluffy "web" of unbonded fibers having individual fiber diameters of 0.2 to 5 microns and wound with sufficient compression to provide between 5 and 50 layers per inch thickness. Best results are obtained when the assembled low-conductive fibrous layers are permanently precompacted in an unbonded "paper" form having a density of less than 8 grams per sq. ft. as distinguished from elastically compressed, "web" forms and have individual fiber diameters of less than about 5 microns and preferably between .05 and 1.0 microns. For best results from the standpoints of insulating efficiency and ease of assembly, the fibrous paper is provided in densities of less than 3 grams per sq. ft. Also, such fibers are preferably less than about 0.5 inches long, and installed with the radiation-impervious layers so as to provide a composite insulation under a compressive load of less than 0.03 lbs. per sq. in.

The spaced radiation-impervious barriers 16 of the composite, alternate layer insulation may comprise either a metal, metal oxide or metal coated material such as aluminum coated plastic film, or other radiation reflective or radiation adsorptive material, or a suitable combination thereof. Radiation reflective materials comprising thin metal foils are particularly suited in the practice of the present invention, and in particular, reflective sheets of foil, e.g. aluminum, having an uninstalled emissivity of between about 0.005 and 0.2, and a thickness between about 0.2 millimeters and 0.002 millimeters. Aluminum foils having a thickness between about 0.005 millimeters and 0.02 millimeters have been found to give best results. Also, the composite insulation is preferably applied so as to provide between about 40 and 250 radiant heat reflecting shields per inch of insulation space cross-section.

The heat leak for small size hoses up to and including 1½" inside diameter constructed in accordance with this invention and employing aluminum foil-permanently pre-compacted glass fiber alternate layer insulation has been found to be between about ¼ and ½ B.t.u. per ft.-hr. when the insulation jacket pressure is about 0.1 microns. This is substantially lower than the corresponding heat leak for any known prior art flexible conduits for low-temperature liquids. For example, in one such conduit employing straight vacuum insulation without any type of filter, rediation alone contributes at least 1 B.t.u. per linear ft. per hr. heat inleak. Other radiation reflective materials which are susceptible of use in the practice of the invention include tin, silver, gold, copper, cadmium or other metals. When fiber sheets are used as the low-conductive material, they may additionally serve as a support means for relatively fragile radiation impervious sheets.

As previously mentioned, it has been found that the present alternate layer insulation provides special advantages in vacuum-insulated hoses, particularly the metal foil-fibrous sheet combination. The pressure imposed by the metal foils prevents fibers from dropping into the convolutions of the metal tubes. Loose fibers or other particulate material between the corrugations should be avoided because they would abrade the metal, prevent free flexing of the hose, and may overstrain the corrugations on the inner radius of a bend. Hoses insulated with powderous materials would be especially susceptible to damage and improper performance for these reasons.

Another unique advantage of the combination metal foil and fiber insulation in the present hose is that the foils serve to protect the rather fragile fiber sheets against damage due to hose flexure. Without foils the severe abrasion and compression imposed repeatedly on the fibrous insulation by the rough, uneven metal surfaces will soon break and separate the brittle unbonded fibers. Bare uninsulated areas eventually develop through which the inner conduit and jacket make metal-to-metal contact with consequent high heat transmission. The reflective foils absorb the abrasion, distribute the compressive loads more uniformly through the insulation, and hold the unbonded fibers evenly distributed in the respective layers.

Still another important advantage of using alternate layer insulation in the present hose is that such insulation provides an excellent continuous spacer to maintain the concentricity of the liquid conduit within its vacuum jacket. No additional spacers or tube separators with their attendant heat leak, are required. In previous attempts to provide satisfactory conduits for cryogenic fluids, the requirement for numerous centering supports in the vacuum space has added greatly to the cost and complexity of manufacture and has penalized the performance of the insulation. However in the present invention the composite insulation may serve as the sole centering support for the concentric tubes throughout the entire hose length between end connections.

Finally the flexible insulated conduit of this invention benefits greatly from the relatively moderate vacuum requirement inherent in the highly effective, alternate layer insulation. The fine fibers obstruct heat transport by molecular motion of the residual gas and provide good insulation performance with absolute pressures 10 to 100-fold higher than those required in systems employing straight-vacuum without filler. This is an important advantage in cryogenic hoses where extreme vacuums are exceptionally difficult to maintain because of the repetitive temperature cycling imposed on the unit.

The following Table I lists suitable specifications for various size flexible hoses, constructed in accordance with this invention:

TABLE I

| Nominal Inner Conduit I.D. (in.) | Nominal Jacket I.D. (in.) | Approximate No. Layers of Insulation | Approximate overall O.D. (in.) | Min. Bending Radius (in.) |
|---|---|---|---|---|
| 1/4 | 3/4 | 9 | 1.1 | 7 |
| 1/2 | 1 1/4 | 13 | 1.8 | 9 |
| 3/4 | 1 1/2 | 13 | 2.1 | 11 |
| 1 | 2 | 18 | 2.8 | 12 |
| 1 1/4 | 2 1/2 | 23 | 3.4 | 14 |
| 1 1/2 | 3 | 30 | 4.0 | 16 |
| 2 | 3 1/2 | 24 | 4.6 | 20 |
| 2 1/2 | 4 | 22 | 5.3 | 24 |

In Table I, nominal I.D. refers to the minimum internal diameter of a stainless steel tube covered with wire braid, and the composite insulation consists of alternate layers of permanently precompacted glass fibrous unbonded paper and aluminum shields. The fibrous papers weighed less than 3 grams per sq. ft. and were composed of individual fibers having diameters between 0.2 and 0.5 micron, and lengths of below about 0.5 inch. Also, the aluminum shields were about .0062 mm. thick with an emissivity of about .058. Finally, the insulation was assembled with a tightness equivalent to about 62 layers of glass fibrous papers per inch thickness. As few as nine layers of insulation have been used successfully, that is, with barely discernible coolness of the vacuum jacket during a liquid hydrogen transfer.

The corrugated tubing used in the present flexible hose may be purchased as standard commercial items, and the sizes given in the preceding Table I are determined largely by the dimensions of standard tubes available on the market. In selecting tube sizes for a given assembly, the minor diameter of the jacket should be sufficiently larger than the major diameter of the inner conduit to provide ample "straight-through" clearance for the insulation.

The insulation space is preferably completely filled with the composite insulation to minimize eccentricity between the inner and outer tubes and to maintain contiguous supporting contact between the component layers. The total number of insulation layers installed with therefore depend upon the annular space provided between the tube walls. Preferably the straight-through clearance for insulation should be at least 0.1 inch and not more than about 0.6 inch. Clearances narrower than this range do not provide the requisite number of shields for effective radiation impedance. Greater clearances contribute only marginal insulating value while increasing considerably the heat capacitive mass to be cooled-down for service. Greater clearances with attendant heavier conduit also penalize unnecessarily the flexibility, lightness and economy of the hose.

The minimum bending radius listed in the last column of Table I is the minimum radius that can be imposed without danger of damage to the hose. These limits are always imposed on corrugated metal tubing regardless of its use, and normally no precautions are taken to prevent abuse of the hose by bending to a smaller radius. To some extent the wire braid will help to restrain the hose from bending beyond the allowable limit. In the present hose assembly, the minimum radius is usually imposed by the larger diameter jacket.

Since it is necessary to maintain the annular space between the two conduits 10 and 11 under a substantial degree of vacuum for high insulating efficiency, a preferred embodiment includes means for removing gases accumulating in such space. More specifically, an adsorbent such as crystalline zeolitic molecular sieve material having pores of about 5 angstrom units in size, may be provided for removing traces of water and air, in accordance with the teachings of U.S. Patent No. 2,900,800 to P. Loveday. Alternatively, or in addition to the adsorbent, a hydrogen selective getter such as palladium oxide or silver exchanged zeolite X may be provided for removing hydrogen evolved from the surrounding metal surfaces in accordance with U.S. Ser. No. 836,968, filed Aug. 31, 1959, in the name of L. C. Matsch et al., now Patent No. 3,108,706.

Some services for cryogenic hoses require intermittent or cyclic operation in which the cold service periods may be of insufficient duration for effective use of an adsorbent. In such cases, an active metal getter such as barium may preferably be employed to remove all residual gases with exception of the inerts, in accordance with U.S. Ser. No. 792,250 filed Jan. 27, 1959, in the name of A. W. Francis, now Patent. No. 3,114,469.

The aforementioned adsorbent-getter systems are illustrated in FIG. 3, and rigid tube 17 is provided at least at one end of the flexible hose assembly. Tube 17 has about the same diameter as corrugated jacket 11, and is bonded thereto at one end. The annulus at the other end of tube 17 is sealed to retain the adsorbent by means of a porous plug 18, which for example may be formed of glass wool. The end of corrugated inner conduit 10 is metal-bonded to inner, rigid end conduit 19, and the outer end thereof is surrounded by thin-walled, tubular connector 20 having an inner diameter slightly larger than the outer diameter of inner end conduit 19. One end of tubular connector 20 is flared and joined to tube 17, and the other end is sealed to the extremity of inner end conduit 19.

An annular space 21 is provided between the inner wall of rigid tube 17 and the outer wall of inner end conduit 19, and is bounded at one end by plug 18. Composite insulation 13 extends into space 21 to contact plug 18. The remaining portion of annular space 21 is filled with an adsorbent, preferably calcium zeolite A as disclosed and claimed in U.S. Patent No. 2,882,243, to remove traces of air and water accumulating in the insulation space 12. Other suitable adsorbents include silica gel and charcoal. It is to be noted that the adsorbent 22 is located adjacent to the cold inner end conduit 19 as its capacity is higher at low temperatures. An alternate method of installing the adsorbent material is to distribute it sparsely along the length of the flexible, corrugated inner conduit 12 while applying the first layer of composite insulation 13. Thus, the adsorbent material 22 is provided in communicating relationship with the annular insulation space 12.

A sealed capsule 23 formed of glass or other frangible material, and containing a suitable amount of active selective hydrogen getter material 24 preferably in a vacuum, is suitably disposed in a getter chamber or protuberance 25 which communicates with the annular adsorbent space 21. At the desired time, preferably after the space 21 and the communicating insulating space 12 have been exhausted by a vacuum pump or other suitable apparatus, the selective hydrogen getter chamber 25 is suitably deformed as with a pair of pliers or a screw clamp, thereby crushing the glass capsule 23 and exposing the hydrogen selective, active getter material 24 to the communicating spaces 12 and 21. The capsule 23 and chamber 25 are preferably held in thermal contact with the warm wall of rigid tube 17 since the rate of gettering decreases with a reduction in temperature. Palladium oxide is the preferred selective hydrogen getter, although copper oxide and metal exchanged zeolitic molecular sieves such as silver exchanged zeolite X are also suitable.

As previously mentioned, adsorbents must be maintained at relatively low temperatures to achieve high adsorptive capacities. If the present flexible hose is to be used under circumstances such that the cold service periods are infrequent or intermittent, it is preferred to employ an active elemental metal getter such as finely divided barium. Elemental metal getters remove traces of all predominant gases including moisture, air and hydrogen, and their gettering capacities are not as sensitive to temperature as are the previously discussed adsorbents. The active elemental gettering material may for example be used in sealed capsule 23 instead of the hydrogen selective getter. In this event, space 21 could be eliminated or alternatively filled with the composite insulation 13.

The present invention also includes a method of applying flexible, composite insulating material to a curved surface, the composite insulation consisting of a multiplicity of radiation impervious barriers such as aluminum foil, and low heat conductive fibrous layers such as sheets of glass fiber paper or mats. The installation of such composite insulating material presents serious problems since the components are thin, rather fragile and do not conform readily to a compound curvature. For example, it has been found that if the insulation is applied as smooth continuous "tubes" of foil and fiber, even moderate flexing causes the foils to shorten and draw back from the hose ends as a result of wrinkling and buckling. This exposes a considerable length of the inner conduit to radiation. More severe flexing of continuous foil layers causes the foils to break or tear, thereby producing "windows" for radiant heat flow. These problems are overcome by providing the radiation impervious barriers in elongated strips. As illustrated in FIG. 4, the radiation-impervious strips are helically wrapped without bonding around the curved surface, e.g. cylinder 31, from one end to the other end thereof so as to provide an overlap between adjacent edges 32 and 33 of adjacent helices, e.g. 34 and 35.

The overlapped edges of the helical windings slide one upon the other as the hose is flexed and this eliminates the foil-shortening problem encountered with continuous foil layers. The degree of overlap is important and must be sufficient to prevent spreading the edges of the windings apart when the hose is flexed to the minimum radius expected in service. Spreading the windings should be avoided since this opens unshielded areas in the insulation and increases radiation. Furthermore the separated edges will catch one on the other when the hose is again straightened thus wrinking or tearing the ribbon edges and producing permanent radiation "windows." An overlap of 10% of the strip width is considered the minimum for dependable insulation performance, while an overlap in excess of 30% is unnecessary and should be avoided since it adds excessive heat capacitive material and increases cool-down losses. An overlap width of about 20% of the radiation impervious strip width represents a preferred balance between heat capacitive mass and dependable insulation performance.

When the curved surface is cylindrical as for example the present flexible hose, it has been found that the radiation impervious strip should have a width between 125% and 185% of the cylinder diameter. This range is advantageous because the resultant insulation is economically applied, and in the case of the hose, the insulation will possess a flexibility which is approximately matched to the flexibility of the hose.

On completion of helical wrapping the curved surface from end-to-end, a first radiation-impervious barrier is formed. As illustrated in FIG. 5, a concentric layer 36 of the low heat conductive fibrous material is then applied around the outer surface of the helically wound first radiation impervious barrier so as to completely cover the barrier. The fibrous material layer can, for example, be applied satisfactorily by helical wrapping or as individual sheets of any convenient length, the widths of which are at least as great as and preferably equal to the circumference of the layer being applied. A second, helically wound radiation-impervious barrier is then formed around the outer surface of the concentric layer of the low heat conductive fibrous material in the same manner as the first radiation impervious barrier so as to completely cover the low conductive fibrous layer. Thereafter, additional layers of low heat conductive fibrous material and barriers of radiation impervious material are similarly applied in alternating sequence and in sufficient quantity to achieve a desired degree of thermal insulation for the curved surface.

As mentioned above, the low-conductive fibrous component of the insulation may also be applied in the form of strips wound helically to form discrete layers separating the layers of radiation barrier. When the fibrous component is used in strip form, still another mode of applying the composite insulation in concentric layers is possible. The radiation barrier and fiber strip materials may first be overlaid and then wound on the conduit as though a single strip. The appearance of this construction is shown in FIG. 6 with the thickness of insulation layers greatly exaggerated for clarity. To avoid contact between radiation barriers in adjacent layers, the fiber strip should be wider than the radiation barrier, and the two strips should be overlaid with marginal fiber material extending beyond both edges of the radiation barrier. As illustrated, flexible corrugated inner conduit 10 is surrounded by wire braid 14, and three composite insulation layers 40, 41 and 42 of progressively increasing diameters. Each layer comprises a strip 43 of low-conductive fibrous material and a relatively narrower strip 44 of radiation impervious material.

Viewed in cross-section, a curved surface insulated by the present wrapping method using any of the described techniques results in discrete concentric cylinders of insulation components. The radiation barriers are entirely separate one from another without metallic contact.

In an alternative method of applying this composite insulation, as disclosed for example in previously referenced copending application S.N. 597,947, now U.S. Patent 3,007,596, the component layers may be wound as continuous spirals from the innermost to the outermost layer. Two adjacent shields at any selected point in the insulation are thus connected metallically by the continuation of the shield around the insulation layer. While this continuous spiral technique is satisfactory for insulating large conduits or tanks, it is not the preferred method for small size objects such as the conduits of this invention. This is because the heat conduction inward along the spiral shield is sufficient to reduce significantly the temperature difference between layers and thus disturb the temperature gradient through the insulation thickness. For example, in a 3-inch diameter layer heat transmission through the insulation is theoretically increased more than 15% when spiral, rather than concentric shields are used, while in 2-inch and 1-inch layer sizes the increase is more than 40% and 170%, respectively. Furthermore, it is difficult to employ the overlapping ribbon technique to achieve flexibility when using the continuous spiral method of insulation. For the above reasons, the composite insulation is preferably applied as concentric layers in one of the previously described modes.

This composite insulation assembly method employing concentric layers is particularly suitable for applying the insulation in annular space 12 between the flexible inner conduit 10 and outer jacket 11 of the flexible hose assembly of this invention. Also the radiation impervious barriers of such assembly method are preferably helically wound metallic ribbon having a thickness between about 0.002 and 0.2 mm. and a width between 125% and 185% of the conduit diameter. The low heat conductive fibrous component is preferably a permanently precompacted paper, and the composite insulation is applied with sufficient tightness to provide between 40 and 250 shields per inch of thickness, under a compression of less than 0.03 lb. per square inch. Alternatively, the low heat conductive fibrous component may be a relatively loose web of fibers which is preferably compressed sufficiently during installation to provide between about 5 and 50 radiation shields per inch of insulation thickness.

Although preferred embodiments have been described in detail it will be understood that modifications and variations may be effected without departing from the spirit and scope of the invention.

Whit is claimed is:

1. A method for applying flexible, composite heat insulating material to the outer curved surface of a cylindrical conduit for transporting low temperature liquids, the composite insulation consisting of a multiplicity of radiation impervious metallic strips of thickness between about 0.002 and 0.2 mm. and low heat conductive fibrous layers, which method comprises the steps of providing said radiation-impervious metallic strips and low heat conductive fibrous layers in elongated overlaid strips with marginal fibrous material extending beyond both edges of each radiation-impervious metallic strip to form a composite strip; helically wrapping said composite strip around said curved surface from one end to the other end thereof so as to provide an overlap between adjacent edges of adjacent helices and thereby form a composite insulation layer; forming a second helically wound composite insulation layer around the outer surface of the first in the same manner so as to completely cover the first composite insulation layer; thereafter similarly applying additional layers of composite insulation in sufficient quantity to achieve a desired degree of thermal insulation for said curved surface.

2. A method according to claim 1 wherein said curved surface is the outer side of a flexible corrugated metallic inner conduit for transporting low temperature liquids, and the outer surface of said flexible, composite heat insulating material is contiguously associated with the inner surface of a larger flexible corrugated metallic jacket being concentrically spaced around the inner conduit.

3. A method according to claim 1 wherein the width of said radiation impervious strip is between 125% and 185% of the cylinder diameter.

4. A method according to claim 1 wherein said low heat conductive fibrous layers are sufficiently elastically compressed so as to provide between about 5 and 50 radiation impervious barriers per inch of composite insulation thickness.

5. A method according to claim 1 wherein said low heat conductive fibrous layers are permanently precompacted paper, and the composite insulation is applied sufficiently tightly around said curved surface so as to provide between about 40 and 250 shields per inch of thickness, under a compression of less than 0.03 lb. per sq. in.

6. A method according to claim 1 wherein said metallic strips are formed of aluminum foil.

References Cited

UNITED STATES PATENTS

| | | | |
|---|---|---|---|
| 338,733 | 3/1886 | Habirshaw | 57—160 |
| 1,942,468 | 1/1934 | Andrews | 138—111 |
| 2,170,207 | 8/1939 | Mosier et al. | 138—129 |
| 2,858,854 | 11/1958 | Daggett. | |
| 2,954,803 | 10/1960 | Barnes et al. | 138—143 |
| 3,136,113 | 6/1964 | Cullen et al. | 57—160 |

CHARLIE T. MOON, *Primary Examiner.*